(12) United States Patent  
Johnson

(10) Patent No.: US 7,721,991 B2  
(45) Date of Patent: May 25, 2010

(54) TRANSLATABLE AND ROTATABLE PASSENGER SEAT

(75) Inventor: Glenn Johnson, King, NC (US)

(73) Assignee: BE Aerospace, Inc., Wellington, FL (US)

( * ) Notice: Subject to any disclaimer, the term of this patent is extended or adjusted under 35 U.S.C. 154(b) by 421 days.

(21) Appl. No.: 11/870,558

(22) Filed: Oct. 11, 2007

(65) Prior Publication Data

US 2008/0088160 A1    Apr. 17, 2008

Related U.S. Application Data

(60) Provisional application No. 60/829,216, filed on Oct. 12, 2006.

(51) Int. Cl.
   *B64D 13/00*    (2006.01)
(52) U.S. Cl. .................................................. 244/118.6
(58) Field of Classification Search .............. 244/118.5, 244/118.6; 297/147, 161, 162
   See application file for complete search history.

(56) References Cited

U.S. PATENT DOCUMENTS 4,588,226 A * 5/1986 Young et al. ........... 297/344.24

6,669,141 B2   12/2003 Schmidt-Schaeffer
7,213,882 B2    5/2007 Dryburgh et al.

FOREIGN PATENT DOCUMENTS

| EP | 1162138 A2 | 12/2001 |
| EP | 1211176 A1 | 6/2002 |
| GB | 2295962 | 6/1996 |

* cited by examiner

*Primary Examiner*—Timothy D Collins  
*Assistant Examiner*—Michael Kreiner  
(74) *Attorney, Agent, or Firm*—Adams Intellectual Property Law

(57) ABSTRACT

A passenger seat includes a seat bottom and a seat back operably coupled to the seat bottom. The passenger seat is translatable fore-and-aft and side-to-side in a horizontal direction, and is rotatable about a vertical axis so as to be oriented in any desired horizontal direction. The passenger seat is movable between an upright seating position and a reclined sleeping position. A passenger seating arrangement consists of a plurality of passenger seats arranged in a column with adjacent passenger seats separated by a privacy divider. A tray table carried by the privacy divider is mounted so as to be selectively raised and lowered and to be rotatable about a horizontal axis. Each passenger seat may include a leg rest operably coupled to the seat bottom and movable between a lowered position and a raised position for use in the upright seating position and the reclined sleeping position, respectively.

8 Claims, 4 Drawing Sheets

US 7,721,991 B2

TRANSLATABLE AND ROTATABLE PASSENGER SEAT

CROSS-REFERENCE TO RELATED APPLICATIONS

This application claims the benefit of priority of U.S. Provisional Application No. 60/829,216, filed on Oct. 12, 2006.

BACKGROUND OF THE INVENTION

The invention relates to passenger seating. More particularly, the invention relates to a passenger seat that is both translatable and rotatable between an upright seating position and a reclined sleeping position within a minimal amount of space.

Long-haul aircraft regularly fly non-stop flights to destinations 12-18 hours or more from the origination point. At present, first class cabins provide various forms of "sleeper seats" in which a movable seat back reclines to the point where the passenger is able to attain a prone or nearly-prone position. In some cases the seat forms a substantially horizontal sleeping surface, while in other cases the seat back of the seat is raised somewhat above the remainder of the seat with the seat back fully reclined. The seat is also typically separated from an adjacent seat by a privacy divider.

Although such sleeper seats provide acceptable passenger comfort, certain disadvantages remain. Because aircraft operating costs are directly linked to the physical size and attendant aerodynamic drag of the fuselage, it is desirable to make the aircraft cabin as small as possible. Existing sleeper seats consume a large amount of space within the aircraft cabin, thereby increasing the size of the aircraft required to accommodate a desired number of sleeper seats in a predetermined configuration. In addition, the accompanying privacy dividers oftentimes leave the passenger with an undesirable "confined" sensation when the seat is not being used for sleeping.

Accordingly, there is a need for a passenger seat that provides both a comfortable upright sitting position and a comfortable reclined sleeping position, while minimizing the amount of space consumed by the seat within an aircraft cabin.

BRIEF SUMMARY OF THE INVENTION

These disadvantages and resulting need are addressed by the present invention, which provides a passenger seat that is both translatable and rotatable between an upright seating position and a reclined sleeping position within a predetermined amount of space allotted for a passenger.

In one aspect, the invention is a passenger seat including a seat bottom defining a forward edge of the passenger seat and a seat back operably coupled to the seat bottom. The passenger seat is translatable fore-and-aft and side-to-side in a generally horizontal direction, and is rotatable about a generally vertical axis so that the forward edge of the passenger seat can be oriented in any desired horizontal direction. The passenger seat is movable between an upright seating position and a reclined sleeping position. Preferably, the reclined sleeping position is a fully reclined "lie-flat" sleeping position.

In another aspect, the invention is a passenger seating arrangement consisting of a plurality of passenger seats arranged in at least one column generally parallel to a longitudinal axis of an aircraft cabin. Each passenger seat includes a seat bottom and a seat back operably coupled to the seat bottom. Furthermore, each passenger seat is both translatable and rotatable between an upright seating position and a reclined sleeping position. Preferably, each passenger seat is translatable fore-and-aft and side-to-side in a generally horizontal direction and is rotatable about a generally vertical axis so that the passenger seat can be oriented in any desired horizontal direction.

In yet another aspect, each pair of adjacent passenger seats in the column is separated by a privacy divider. Each privacy divider is configured to be higher at a proximal end thereof to shield a passenger from view in the reclined sleeping position and lower at a distal end thereof to permit the passenger to see over and around the privacy divider in the upright seating position.

In yet another aspect, a tray table is carried by the privacy divider disposed in front of each passenger seat. The tray table is mounted to the privacy divider so as to be selectively raised and lowered for use in the upright seating position and the reclined sleeping position, respectively. The tray table is also mounted to the privacy divider so as to be rotatable about a generally horizontal axis to expose an upper surface for use in the upright seating position and a lower surface for use in the reclined sleeping position. Preferably, the upper surface is substantially flat and rigid, while the lower surface is padded and contoured.

In yet another aspect, each passenger seat further includes a leg rest operably coupled to the seat bottom. The leg rest is movable between a lowered position for use in the upright seating position and a raised position for use in the reclined sleeping position.

BRIEF DESCRIPTION OF THE DRAWINGS

The present invention will be better understood by reference to the following detailed description in conjunction with the accompanying drawing figures.

DETAILED DESCRIPTION OF THE INVENTION

Figure 1:
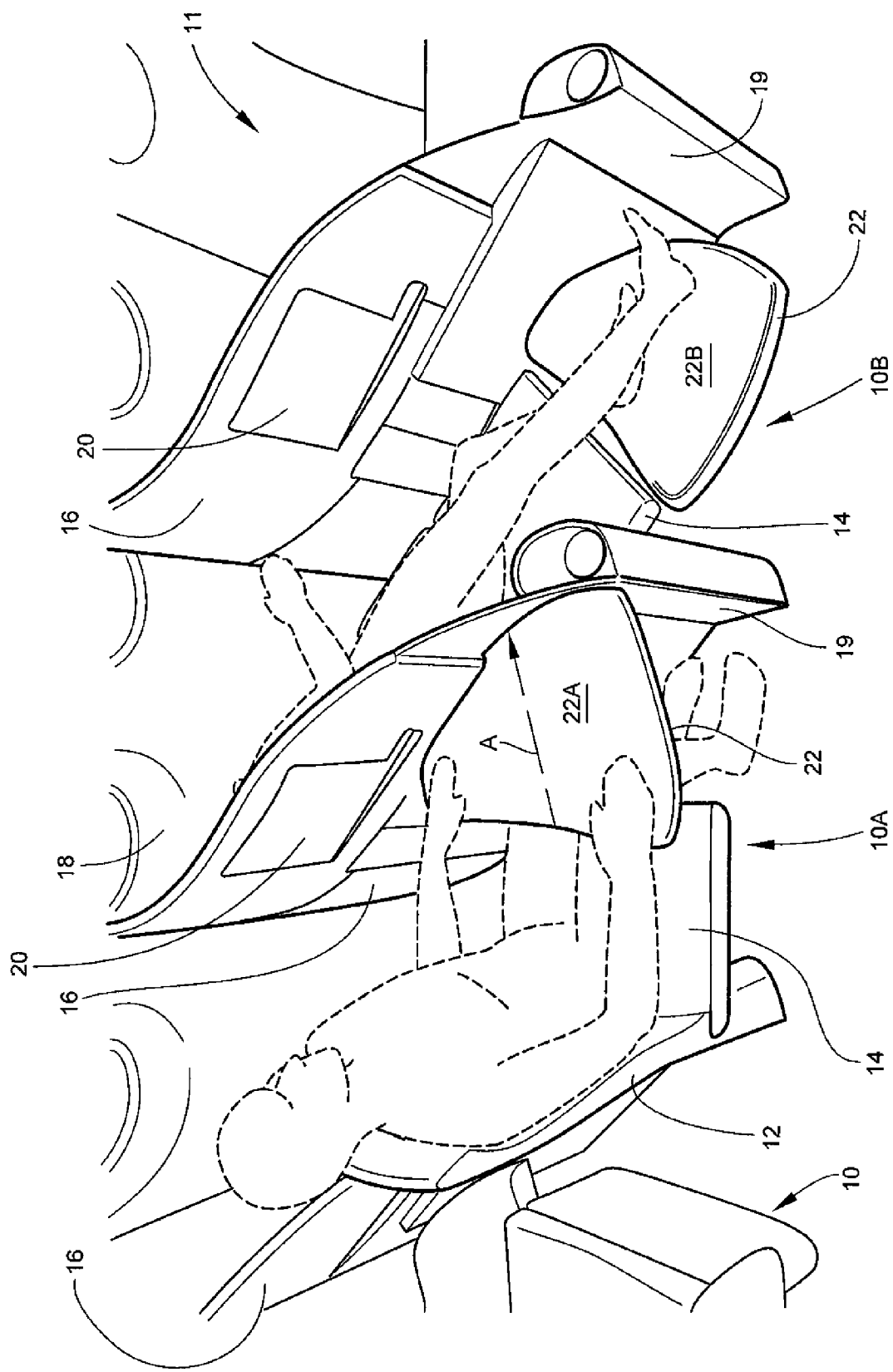
FIG. 1 is a perspective view of a plurality of passenger seats constructed in accordance with present invention.
Figure 2:
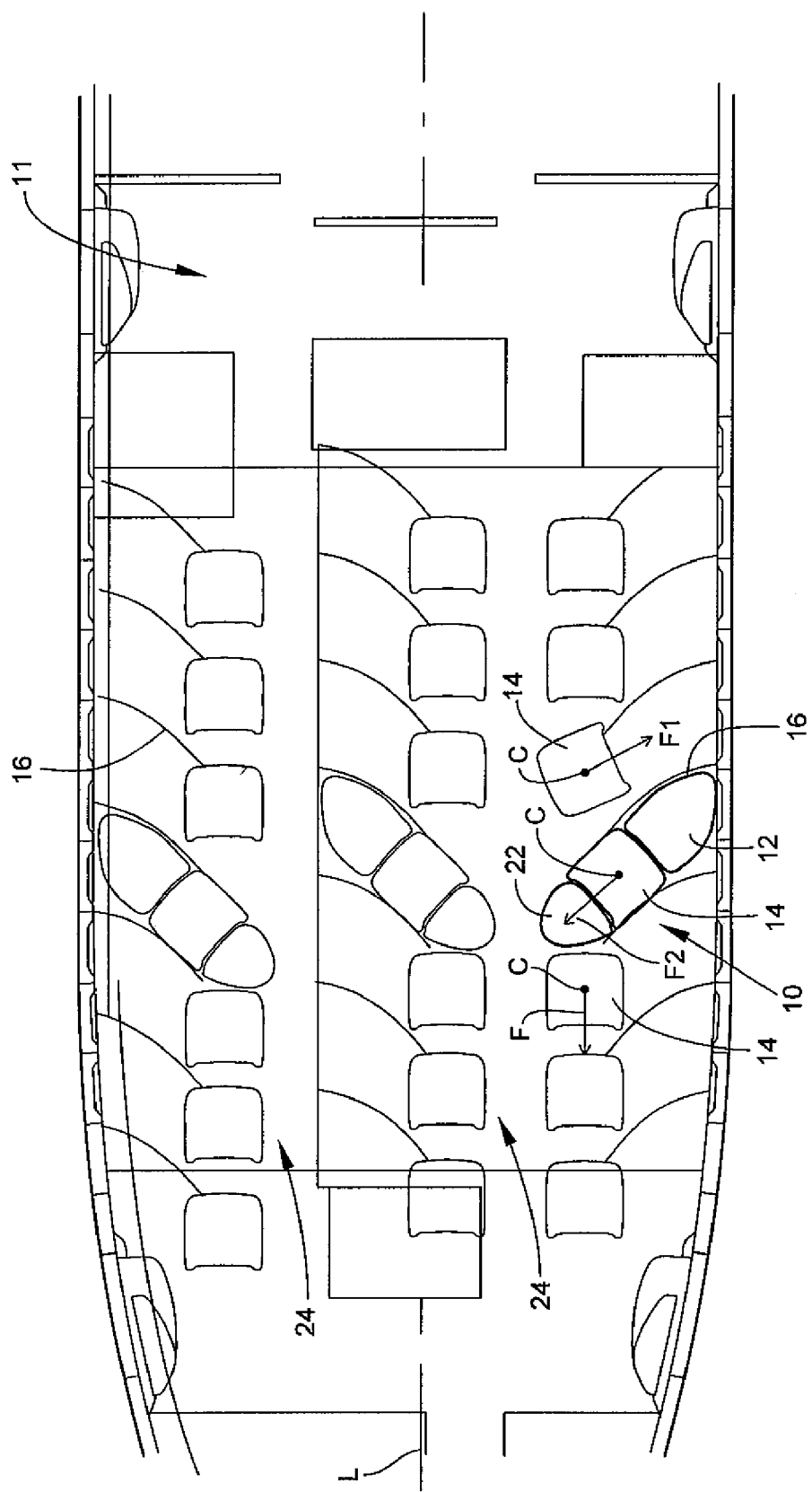
FIG. 2 is a top view of a passenger seating arrangement including a plurality of the passenger seats of FIG. 1 disposed within an aircraft cabin.

Referring to the accompanying drawing figures wherein identical reference numerals denote the same or similar elements throughout the various views, FIG. 1 and FIG. 2 show a plurality of passenger seats 10 in accordance with the present invention disposed within a passenger cabin of a vehicle, for example an aircraft cabin 11 of a commercial aircraft. Each passenger seat 10 comprises a seat back 12 operably coupled to a seat bottom 14 in a suitable manner. The upper portion of the seat back may optionally include separate or integral headrests (not shown). In addition, the passenger seat 10 typically includes optional arm rests (not shown). The passenger seats 10 are supported by a seat frame (not shown), which in turn is mounted to the floor or deck of the aircraft cabin 11 by tracks and track fittings in a manner well known to those of skill in the art. In the exemplary embodiments shown and described herein, the passenger seats 10 are arranged in a plurality of spaced apart columns generally parallel to the longitudinal axis L (FIG. 2) of the aircraft cabin 11. However, the passenger seats 10 may be arranged in any suitable orientation within any desired vehicle, such as a bus, train, boat, etc.

Privacy dividers 16 are disposed between adjacent passenger seats 10 in a suitable manner so as to provide a passenger utilizing an individual passenger seat with a generally parallelogram-shaped occupant space. The privacy dividers 16 are configured to permit the passenger to see over and around the dividers while seated in an upright seating position, but to be shielded from view in the forward and aft directions while in other positions. As illustrated in FIG. 1, the privacy divider 16 is higher at a first end proximate an outboard wall 18 of the aircraft cabin 11 in order to provide a maximum degree of privacy, and is lower at its distal (inboard) end 19 so as to provide improved visibility and to avoid having the passenger experience an undesirable "confined" sensation. The upper portion 20 of the privacy divider 16 may be configured such that it can be selectively raised or lowered, or otherwise retracted and extended, by the passenger.

A tray table 22 is carried by the respective privacy divider 16 in front of each passenger seat 10. As described in greater detail below, the tray table 22 is mounted such that it may be selectively raised and lowered, and may be flipped over, for example by rotation about the axis denoted by reference character A in FIG. 1 to expose either an upper surface 22A that is flat and rigid, or a lower surface 22B that is preferably padded and may be contoured to a desired shape. For example, the tray table 22 may be rotatably mounted on a horizontal shaft (not shown) which is in turn carried on a vertical rail or channel (not shown) formed in the privacy divider 16.

Each passenger seat 10 is provided with appropriate movable components, controls, and/or actuators to enable a passenger seated therein to maneuver the passenger seat into various positions, including at least an upright seating position and a reclined sleeping position. In a preferred embodiment, the sleeping position is a fully reclined sleeping position commonly referred to as a "lie-flat" configuration in which the passenger seat 10 functions as a bed. The passenger seat 10 is also optionally movable into a number of intermediate configurations.

More specifically, each passenger seat 10 may be translated fore-and-aft as well as side-to-side in a generally horizontal direction over a substantial range of motion from a neutral position. In addition, each passenger seat 10 may be rotated (i.e. swiveled) about a generally vertical axis, by as much as a full 360 degrees, so that a forward edge of the passenger seat can be oriented in any desired horizontal direction, as indicated by the arrows denoted by reference characters F, F1 and F2 in FIG. 2. Movement of the passenger seat 10 may be accomplished manually or may be powered with actuators of a known type. Regardless, the combination of horizontal translation and rotation about a generally vertical axis provides the capability for multiple passenger seat positions not previously achievable with conventional passenger seats.

For example, the aft-most passenger seat in FIG. 1 designated by reference character 10A is shown in the upright seating position for activities such as takeoff and landing, dining, working, and video viewing. The seat bottom 14 is generally horizontal and translated such that the center of mass C (FIG. 2) of the seat 10 is in a relatively inboard location. In other words, the passenger seat 10 extends beyond the area bounded by the privacy divider 16 in the direction of an aisle 24 of the aircraft cabin 11. At the same time, the seat back 12 remains substantially upright or only partially reclined.

After being translated in the direction of the aisle 24, the passenger seat 10 can be rotated through an angle of about 360 degrees so that the passenger can face various directions, including towards another passenger seated in an adjacent row or column of seats. The passenger seat 10 can also be rotated about the substantially vertical axis to face into the space between two adjacent privacy dividers 16, as indicated by the arrow denoted by the reference character F2 in FIG. 2. This latter configuration provides a "personal cabin" for the passenger within the parallelogram-shaped occupant space defined by the adjacent privacy dividers 16.

Referring again to FIG. 1, the passenger seat denoted by the reference character 10B is shown in a reclined sleeping position, and more particularly, in a fully reclined "lie-flat" configuration. The passenger seat 10B faces in the direction of aisle 24 and generally parallel to the adjacent privacy dividers 16, as indicated by the arrow denoted by reference character F2 in FIG. 2. The center of mass C of the passenger seat 10B is translated in the direction of the outboard wall 18 of the aircraft cabin 11. The passenger is then permitted to fully recline, with the passenger's head situated only slightly above, or level with, the remainder of the passenger's body. Preferably, the tray table 22 is rotated about the axis A such that its padded surface 22B faces upwards, and is then lowered such that the padded surface is aligned with the horizontal plane of the seat back 12 and seat bottom 14 to collectively form a sleeping surface.

Figure 3A:
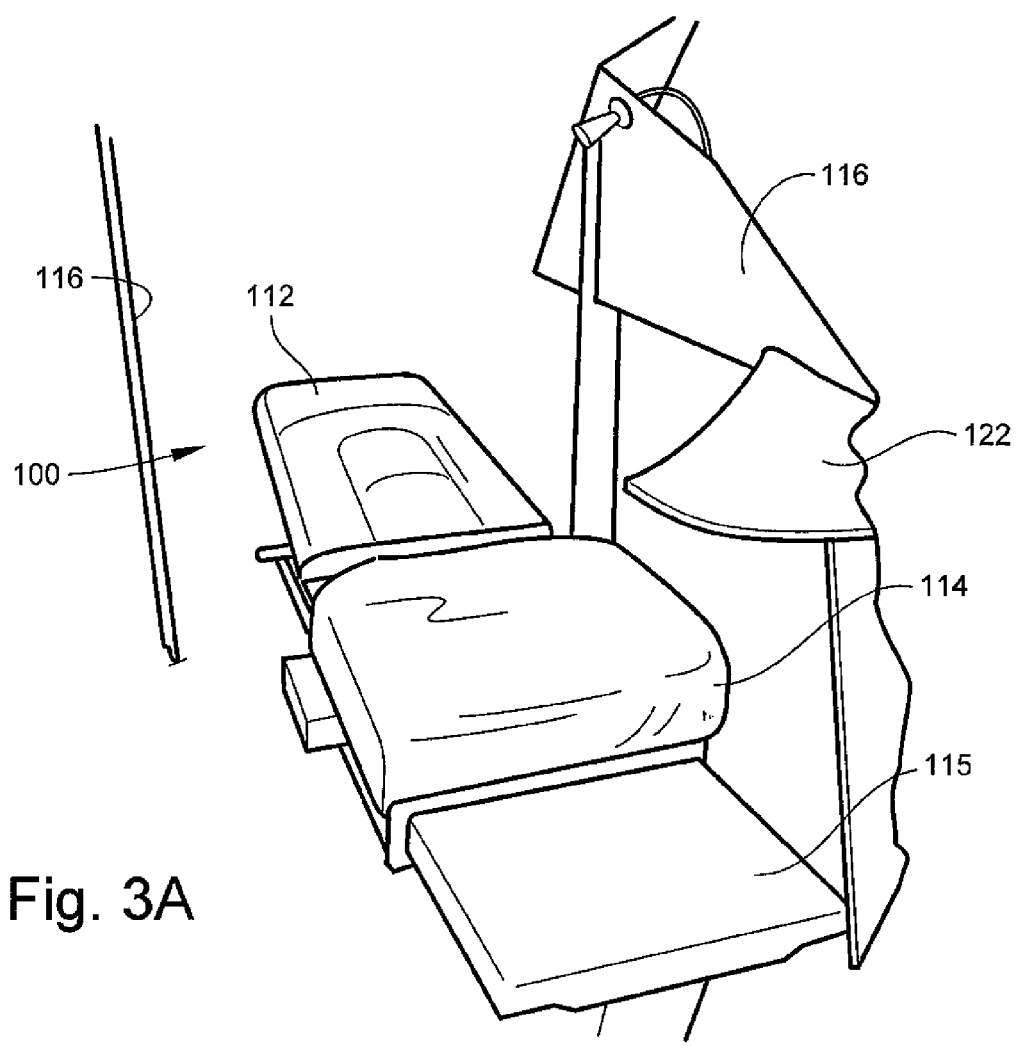
FIG. 3A is a perspective view of an alternative embodiment of a passenger seat according to the present invention shown in a fully reclined sleeping position.
Figure 3B:
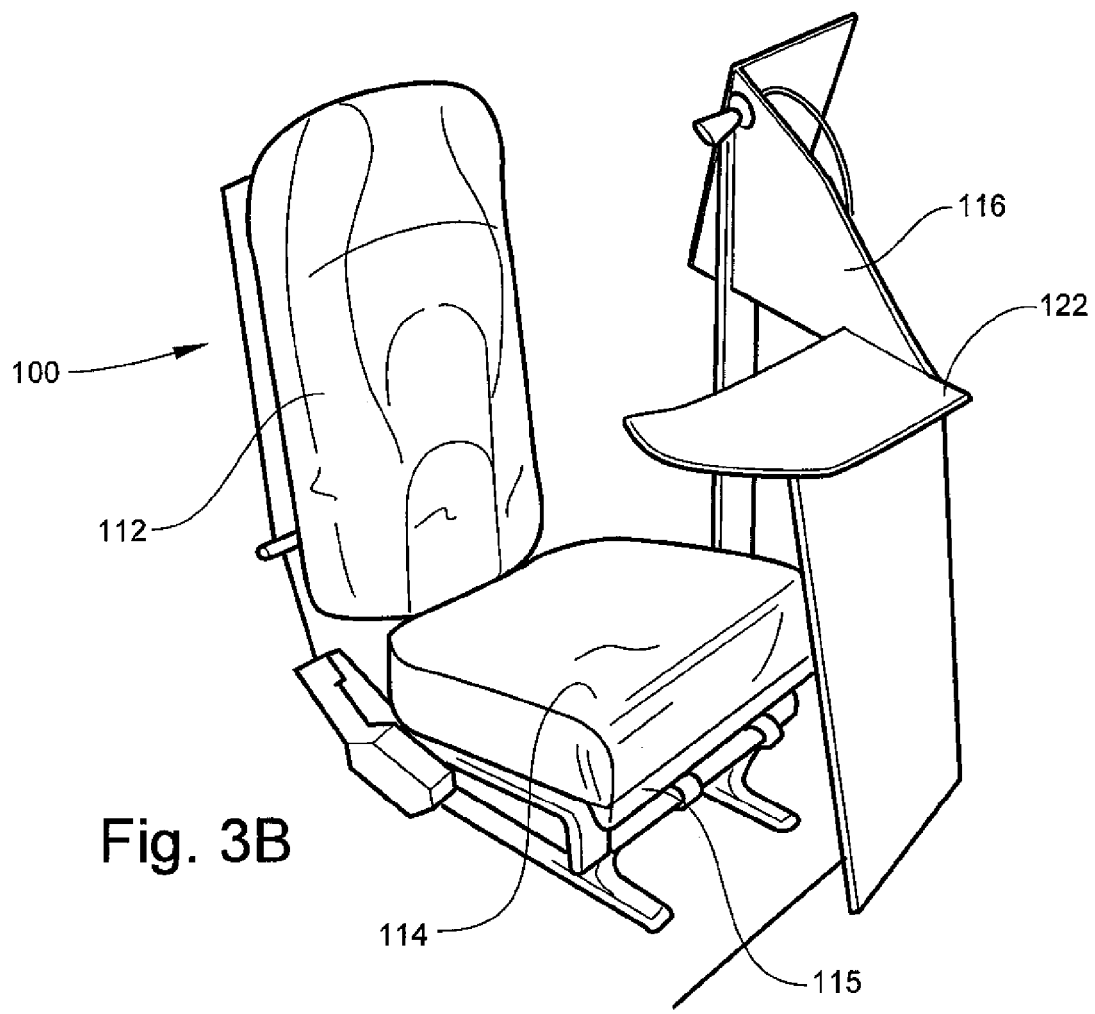
FIG. 3B is a perspective view of the passenger seat of FIG. 3A shown in an upright seating position.

FIG. 3A and FIG. 3B shown an alternative embodiment of a passenger seat 100 configured in accordance with the present invention that is substantially similar to the passenger seat 10. The passenger seat 100 is positioned between adjacent privacy dividers 116 and comprises a seat back 112 and seat bottom 114. The passenger seat 100 may further comprise a leg rest 115 that is operably coupled to the seat bottom 114 and movable between a raised position illustrated in FIG. 3A and a lowered position illustrated in FIG. 3B. The passenger seat 100 is movable, and more particularly, translatable and rotatable, into the various positions (e.g. seating, sleeping) previously described with respect to the passenger seat 10. However, since the passenger seat 100 has its own integral leg rest 115, a conventional stationary or folding tray table 122 may be provided on the privacy divider 116 in front of the passenger.

The foregoing detailed description has described a passenger seat that is both translatable and rotatable between an upright seating position and a reclined sleeping position within a minimal amount of space. While exemplary and preferred embodiments of the present invention have been described, it will be apparent to those skilled in the art that various modifications thereto can be made without departing from the spirit and scope of the invention. Accordingly, the foregoing description of the invention and the best mode for practicing the invention are provided for the purpose of illustration only, and not for purposes of limitation.

That which is claimed is:

1. A passenger seating arrangement comprising: a plurality of passenger seats arranged in at least one column generally parallel to a longitudinal axis of an aircraft cabin, each passenger seat comprising a seat bottom and a seat back operably coupled to the seat bottom, wherein each passenger seat is both translatable and rotatable between an upright seating position and a reclined sleeping position; a privacy divider disposed between each pair of adjacent passenger seats; and a tray table carried by the privacy divider disposed in front of each passenger seat, wherein the tray table is mounted to the privacy divider so as to be selectively raised and lowered for use in the upright seating position and the reclined sleeping position, respectively, and to be rotatable about a generally horizontal axis which is generally orthogonal to the divider to expose an upper surface for use in the upright seating position and a lower surface for use in the reclined sleeping position.

2. The passenger seating arrangement of claim 1, wherein each passenger seat is translatable fore-and-aft and side-to-side in a generally horizontal direction and is rotatable about a generally vertical axis.

3. The passenger seating arrangement of claim 1, wherein each privacy divider is configured to be higher at a proximal end thereof to shield a passenger from view in the reclined sleeping position and lower at a distal end thereof to permit the passenger to see over and around the privacy divider in the upright seating position.

4. The passenger seating arrangement of claim 1, wherein the upper surface is substantially flat and rigid and wherein the lower surface is padded and contoured.

5. The passenger seating arrangement of claim 1, further comprising a leg rest operably coupled to the seat bottom and movable between a lowered position for use in the upright seating position and a raised position for use in the reclined sleeping position.

6. The passenger seat of claim 1, wherein the reclined sleeping position is a fully reclined "lie-flat" sleeping position.

7. The passenger seat of claim 1, wherein a plurality of the passenger seats are arranged in a column extending in a fore-and-aft direction and further comprising a privacy divider disposed between each pair of adjacent passenger seats so as to provide a passenger utilizing the passenger seat with a generally parallelogram-shaped occupant space.

8. The passenger seat of claim 1, wherein an upper portion of the privacy divider is configured to be selectively raised and lowered by the passenger.

* * * * *